W. F. KIESEL, Jr.
LOCOMOTIVE.
APPLICATION FILED MAR. 20, 1916.
1,204,036.
Patented Nov. 7, 1916.
2 SHEETS—SHEET 1.
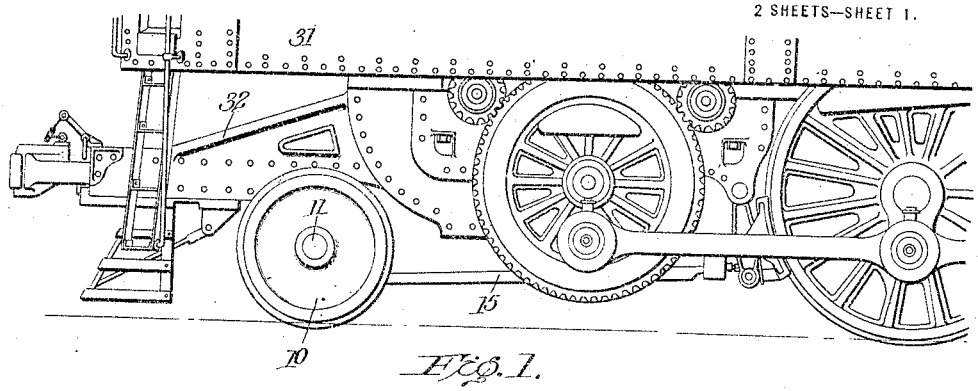
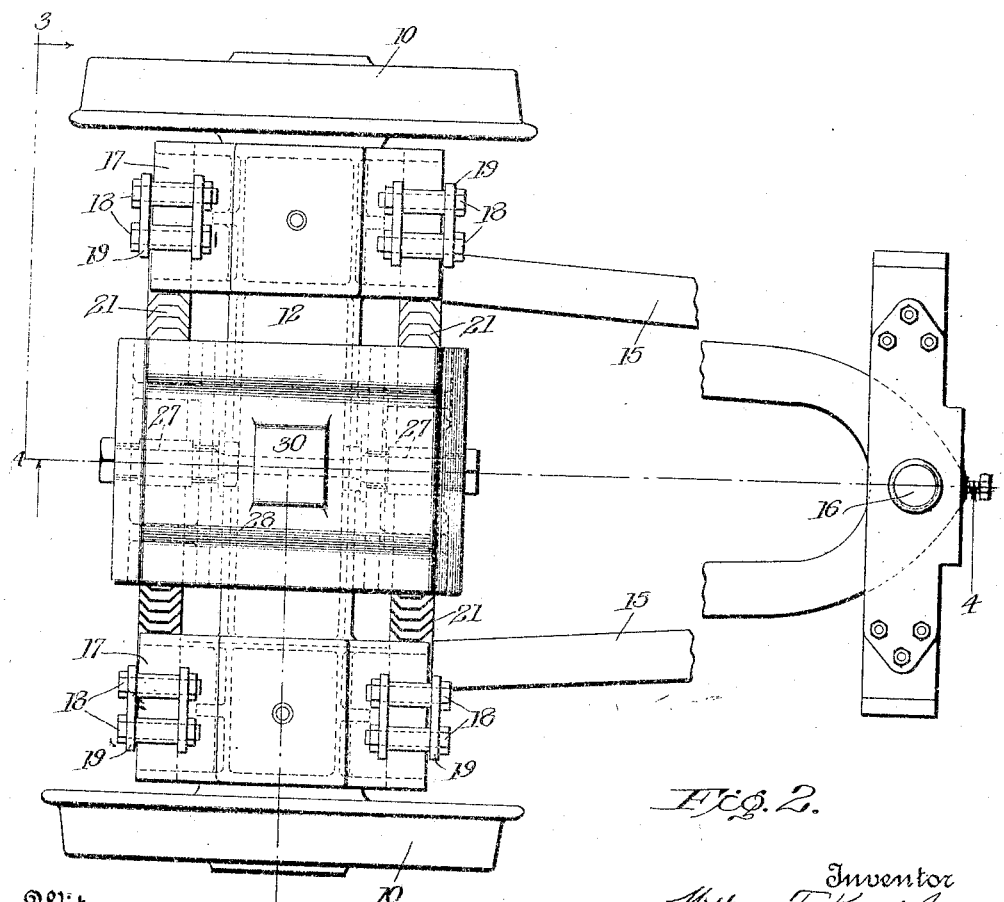

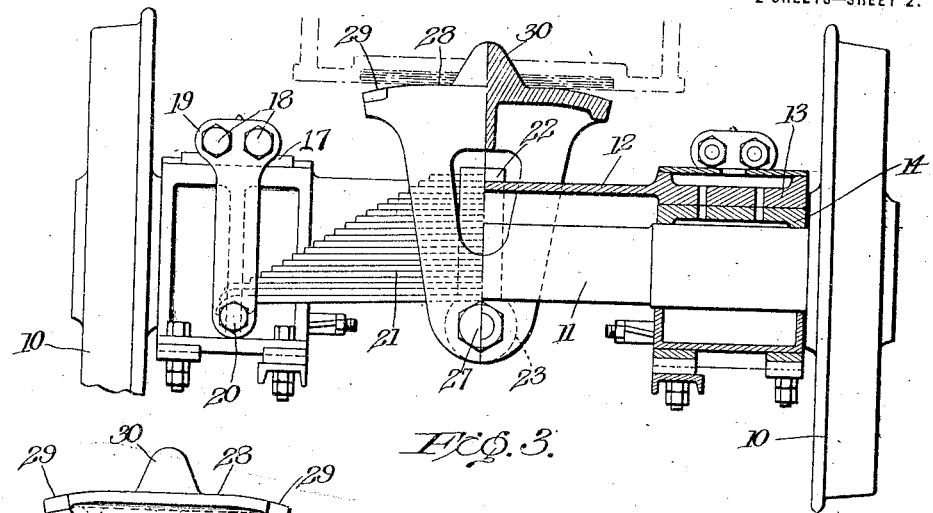
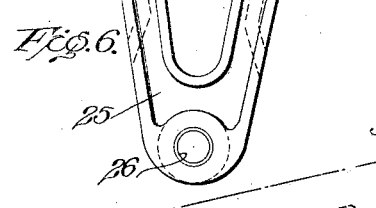
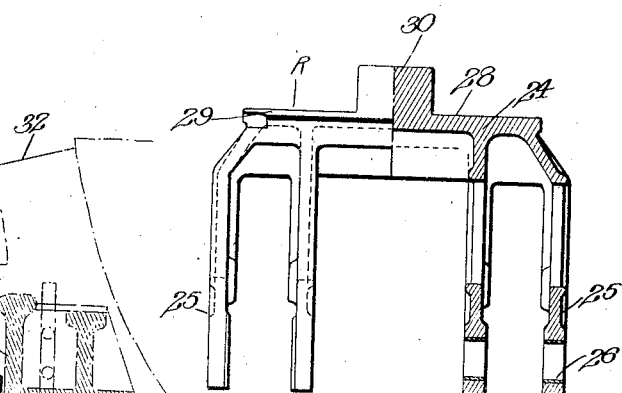
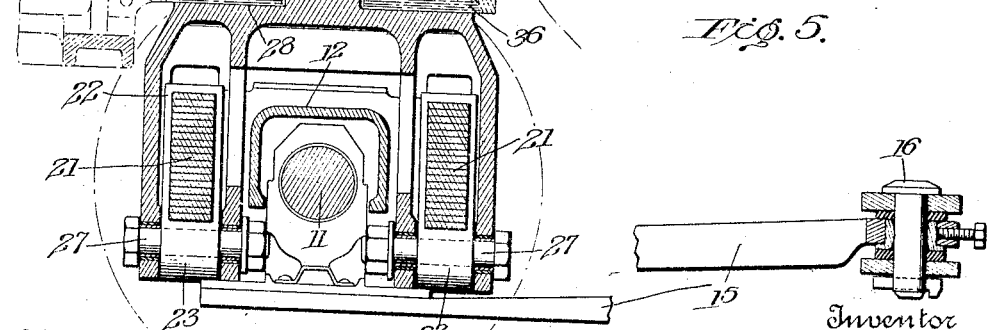

BEST AVAILABLE COPY

UNITED STATES PATENT OFFICE.

WILLIAM F. KIESEL, JR., OF ALTOONA, PENNSYLVANIA.

LOCOMOTIVE.

1,204,036.　　　　Specification of Letters Patent.　　Patented Nov. 7, 1916.

Application filed March 20, 1916. Serial No. 85,428.

*To all whom it may concern:*

Be it known that I, WILLIAM F. KIESEL, Jr., a citizen of the United States, and resident of Altoona, Blair county, State of Pennsylvania, have invented certain new and useful Improvements in Locomotives, of which the following is a specification.

My invention relates to railway vehicles, locomotives especially, and has particular reference to a structure adapted to provide for sufficient lateral motion of the vehicle body and frame with respect to the truck, as on curves where the front truck of the locomotive must have side motion.

On modern large locomotives with the increased number of drivers it is difficult to provide sufficient truck side motion with the ordinary link suspension, and in order to obtain sufficient side motion on curves for the front truck of the locomotive I have devised an arrangement in which the body frame is supported on the truck by means of a rocker which swings transversely of the locomotive and gives the required side motion.

The objects and novel features of my invention will be apparent from the following description taken in connection with the drawings in which, Figure 1 is a side elevation of the front end of a locomotive embodying my invention; Fig. 2 is an enlarged plan view of the pony truck shown in Fig. 1, a part of the truck being broken out. Fig. 3 is partly a front elevation and partly a central section of the truck shown in Fig. 2 and is taken on the line 3—3 of Fig. 2. Fig. 4 is a longitudinal sectional view of the pony truck taken on the line 4—4 of Fig. 2. Fig. 5 is a view of the rocker support, partly in central section; and Fig. 6 is an end view of the rocker support.

The pony truck shown in the drawings is in some respects similar to the one shown and described in my Patent No. 1,166,695, granted January 4, 1916. The wheels 10 of the truck are mounted on the ends of an axle 11. The transom 12 and journal boxes 13 are made in one piece, the journal boxes inclosing the bearings 14 whereby the transom is mounted on the axle 11. For convenience the transom and journal boxes will be designated as the truck frame. The truck frame also has a tail brace 15 extending rearwardly and fulcrumed on the pin 16 around which the truck swings.

On each side of each of the journal boxes there is a seat 17 for pairs of bolts 18 which pass through the upper ends of T-links or hangers 19 at opposite sides of the seats 17. The T-links 19 are connected together in pairs at their lower ends by bolts 20 as seen in Fig. 3 and the end of the lower spring of a series of flat leaf springs 21 is secured between the lower ends of each pair of hangers. The springs 21 are superposed on one another and extend longitudinally of the axle, one complete spring being mounted on each side of the axle and being hung at its ends by pairs of hangers on the same side of the axle 11. Midway between its ends each spring 21 is surrounded by a band 22 which has an enlargement 23 at its lower end below the spring. The enlargement is provided with an opening extending through it for a purpose to be set forth.

The rocker R, shown in Figs. 5 and 6 consists of a casting provided with a head 24 which has two pairs of jaws on its lower side, the members 25 of the jaws being spaced apart a sufficient distance to receive the springs 21 between them. The members 25 are also provided with alined openings 26 which register with the openings in the enlargement 23 of the bands 22 and are arranged to receive the trunnion bolts 27 by means of which the rocker is supported or suspended centrally of the truck so that it may swing transversely of the locomotive. The head 24 of the rocker has a flat bearing surface 28 on its upper side which is of considerable width and is tangent to the curve passing through the curved portions 29 at the edges of the flat portion 28. The head 24 also has a lug 30 on its upper side rising centrally from the flat surface 28. In a particular embodiment of my invention the flat portion 28 at the top of the rocker has been made 10 inches wide so that the T-links 19 are compelled to move about 2 inches before the rocker rotates about its fulcrum pin. It is desirable to have the flat of some width in order to provide a moment of force tending to bring the truck back into alinement with the locomotive. In the T-links this is accomplished by the spread of the top bolts 18 which in the above embodiment is about 3½ inches. I do not wish to be limited to the foregoing dimensions however which are merely illustrative of a practical device. The pairs of jaws are spaced apart a sufficient distance to fit over the transom 12 and as shown in end view in Fig. 6 they taper downwardly. The locomotive body 31 has a body frame 32 fixed to the lower side thereof and a frame supporting casting 33 is securely bolted to the locomotive frame 32. As seen in Figs. 1 and 4 the supporting casting 33 constitutes a mounting for the draft gear and also a center plate to mount the frame upon the rocker R. The casting 33 has an opening 35 adapted to receive the lug 30 on the rocker R. Suitable liners 36 may be inserted between the flat surface 28 of the rocker and the bottom side of the frame supporting casting, for the purpose of properly alining the locomotive frame and to compensate for wheel, journal and bearing wear. As the rocker and frame supporting casting have interfitting parts they will be kept in proper mesh and have sufficient play relatively to each other when there is relative side motion between the frame and the truck.

While I have shown the rocker arrangement embodied in a pony truck on the front of a locomotive, it is to be understood that the invention is not limited to its use in such trucks but it may also be used in trucks having two or more axles.

Having thus described the invention what is claimed and desired to be secured by Letters Patent is:

1. In a railway vehicle, the combination of a truck including a truck bolster, a body frame, a frame supporting member rigidly secured to the frame, and a rocker having means at its lower end whereby it is pivoted on said truck bolster, and also having a bearing surface on the top end thereof upon which said supporting member is mounted, said rocker and frame supporting member having interfitting parts.

2. In a locomotive, the combination of a truck including a truck bolster, a body frame, a frame supporting member rigidly secured to the frame above said bolster, and a rocker having openings at its lower end to receive pins whereby it is pivotally connected to said bolster, said rocker having a flat supporting surface at the outer end thereof upon which said frame supporting member is mounted, said rocker being pivoted so as to swing transversely of the locomotive.

3. In a locomotive, the combination of a truck including a bolster and springs for supporting said bolster, a body frame, a frame supporting casting rigidly secured to the body frame centrally above the bolster, and a rocker pivoted on the bolster so as to swing transversely of the locomotive and having a bearing surface upon which said body supporting casting is mounted.

4. A rocker support for the purpose set forth having a head provided with a bearing surface on the upper side thereof, and having parts on the lower side thereof provided with openings whereby the rocker may be pivotally mounted on a truck.

5. A rocker support of the class described having a head provided on its top with a flat bearing surface, and having jaws at the lower end thereof provided with openings to receive pins whereby the rocker may be pivotally connected to and mounted on a truck.

6. A rocker support for the purpose set forth having a head provided with a bearing surface on the upper side thereof consisting of a flat portion and curved portions on opposite sides of the flat portion, said rocker having downwardly tapering parts on the lower side of the head provided with jaws at the lower ends having openings to receive pins whereby the rocker may be pivotally mounted on a truck.

7. A rocker support of the class described comprising a casting having a flat surface on the upper end thereof and two pairs of jaws at the lower end, said pairs of jaws being spaced apart and each jaw having an opening therein adapted to receive pins whereby the rocker may be mounted upon a truck.

8. A rocker support for the purpose set forth having a head provided with a lug and also having a bearing surface on the upper side thereof, and having means on the lower side thereof whereby the rocker may be pivotally mounted on a truck.

9. A rocker support of the class described having a head at the upper end provided with a bearing surface on the upper side thereof and a lug rising substantially at the center of said bearing surface, said rocker having jaws at its lower end provided with openings to receive pins whereby the rocker may be pivotally mounted on a truck.

10. In a railway vehicle, the combination of a truck, a pair of springs extending transversely of the truck, a rocker pivotally supported by said springs, and a body frame supported on said rocker.

11. In a railway vehicle, the combination of a truck having a pair of transversely extending springs, hangers for supporting said springs, a rocker casting pivotally mounted on said springs and a body frame supported on said rocker casting.

12. In a locomotive, the combination of a truck comprising a truck frame, a pair of springs extending across the truck, hangers mounted on said truck frame and supporting said springs, a rocker pivotally supported on said springs centrally of the truck and arranged to swing transversely of the vehicle, a body frame, a frame supporting casting rigidly secured to the body frame and having an opening therein, said rocker having a lug on the upper end thereof fitting the opening in the frame supporting casting.

13. A pony truck for locomotives comprising an axle, wheels on the axle, a frame constituting journal boxes and a transom, a pair of springs extending longitudinally of the axle on opposite sides thereof, hangers carried by said frame and supporting the springs at their ends and a rocker pivotally mounted on said springs intermediate the ends thereof and provided with a frame supporting surface on its upper side.

14. A pony truck for locomotives comprising an axle, wheels on said axle, a frame carried by said axle and constituting a transom and journal boxes, leaf springs extending longitudinally of said axle on opposite sides thereof, hangers depending from the journal boxes between said frame and supporting said springs at their ends, bands extending around the springs intermediate their ends and having enlargements on the lower sides of the springs, said enlargements being provided with openings, a rocker having pairs of jaws on its lower side, said springs fitting between said jaws and said jaws having openings therein registering with the openings in the enlargements of the bands surrounding said springs, bolts passing through said registering openings to pivotally connect the rocker to the bands, said rocker having a flat bearing surface on its upper side to form a supporting surface.

15. In a railway vehicle the combination of a truck, a body, a spring mounted on the truck, a rocker having jaw members receiving said spring between them and also having a bearing surface for supporting a part of said body, and means engaging the jaw members of the rocker to pivotally support it on said spring.

In testimony whereof I affix my signature.

WILLIAM F. KIESEL, JR.